US011509232B2

(12) United States Patent
Yuasa et al.

(10) Patent No.: US 11,509,232 B2
(45) Date of Patent: Nov. 22, 2022

(54) POWER CONVERTER AND AIR-CONDITIONING APPARATUS USING THE SAME

(71) Applicant: Mitsubishi Electric Corporation, Tokyo (JP)

(72) Inventors: Kenta Yuasa, Tokyo (JP); Akihiro Tsumura, Tokyo (JP); Shigeo Takata, Tokyo (JP); Shinsaku Kusube, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 16/958,466

(22) PCT Filed: Feb. 16, 2018

(86) PCT No.: PCT/JP2018/005446
§ 371 (c)(1),
(2) Date: Jun. 26, 2020

(87) PCT Pub. No.: WO2019/159317
PCT Pub. Date: Aug. 22, 2019

(65) Prior Publication Data
US 2020/0358365 A1  Nov. 12, 2020

(51) Int. Cl.
*H02M 5/458* (2006.01)
*F24F 11/88* (2018.01)
*H02M 1/34* (2007.01)

(52) U.S. Cl.
CPC ........... *H02M 5/4585* (2013.01); *F24F 11/88* (2018.01); *H02M 1/34* (2013.01)

(58) Field of Classification Search
CPC ...... H02M 5/4585; H02M 1/34; H02M 1/007; H02M 1/346; H02M 1/32; H02M 3/156; H02M 5/458; F24F 11/88; Y02B 70/10
(Continued)

(56) References Cited

U.S. PATENT DOCUMENTS

2001/0024374 A1* 9/2001 Ben-Yaakov ....... H02M 1/4225
363/39
2012/0020025 A1* 1/2012 Sotome ................. H01G 4/228
361/704
(Continued)

FOREIGN PATENT DOCUMENTS

JP   H11-285274 A   10/1999
JP    3308993 B2    7/2002
(Continued)

OTHER PUBLICATIONS

Received STIC search report from EIC 2800 searcher Salim Alam dated Nov. 12, 2021. (Year: 2021).*
(Continued)

*Primary Examiner* — Emily P Pham
*Assistant Examiner* — Htet Z Kyaw
(74) *Attorney, Agent, or Firm* — Posz Law Group, PLC

(57) ABSTRACT

A power converter includes a rectifier configured to rectify an AC voltage supplied from an AC power supply, a booster circuit configured to boost the voltage rectified by the rectifier, a smoothing capacitor configured to smooth the voltage output from the booster circuit, a power module configured to convert a DC voltage obtained by smoothing the output voltage by the smoothing capacitor into an AC voltage, and a snubber capacitor configured to absorb a surge voltage superimposed on the DC voltage to be input to the power module. The snubber capacitor is mounted in the power module.

4 Claims, 3 Drawing Sheets

(58) Field of Classification Search
USPC .......................................................... 363/37
See application file for complete search history.

(56) References Cited

U.S. PATENT DOCUMENTS

| | | | |
|---|---|---|---|
| 2013/0322137 A1* | 12/2013 | Lee .................... | H02M 1/4225 |
| | | | 363/45 |
| 2014/0321171 A1* | 10/2014 | Fujita .................. | H02M 5/458 |
| | | | 363/37 |
| 2015/0354881 A1* | 12/2015 | Park ..................... | F25B 49/025 |
| | | | 62/228.1 |
| 2016/0344279 A1* | 11/2016 | Kanda ................. | H02H 7/1225 |
| 2017/0201186 A1* | 7/2017 | Yuasa ..................... | H02M 1/14 |
| 2019/0089240 A1 | 3/2019 | Hattori et al. | |
| 2020/0300521 A1* | 9/2020 | Yamamoto .............. | H02M 7/48 |
| 2021/0111660 A1* | 4/2021 | Matsuda ............... | H02M 7/003 |

FOREIGN PATENT DOCUMENTS

| | | | | |
|---|---|---|---|---|
| JP | 2003-219661 A | 7/2003 | | |
| JP | WO2015064409 | * 5/2015 | .............. | H02M 7/48 |
| JP | 2015-207739 A | 11/2015 | | |
| JP | 2016-009697 A | 1/2016 | | |
| JP | 2017-184367 A | 10/2017 | | |
| WO | WO2016098160 | * 6/2016 | ............ | H02M 3/155 |
| WO | 2017/042889 A1 | 3/2017 | | |
| WO | 2017/051639 A1 | 3/2017 | | |

OTHER PUBLICATIONS

Attached a translated version of foreign patent WO2015064409 with espacenet. (Year: 2015).*
International Search Report of the International Searching Authority dated Apr. 17, 2018 for the corresponding international application No. PCT/JP2018/005446 (and English translation).
Japanese Office Action dated Apr. 13, 2021, issued in corresponding Japanese Patent Application No. 2019-571909 (and English Machine Translation).

* cited by examiner

POWER CONVERTER AND AIR-CONDITIONING APPARATUS USING THE SAME

CROSS REFERENCE TO RELATED APPLICATION

This application is a U.S. national stage application of PCT/JP2018/005446 filed on Feb. 16, 2018, the contents of which are incorporated herein by reference.

TECHNICAL FIELD

The present disclosure relates to a power converter configured to rectify and transform an AC voltage by using a transformer circuit having a switching element, and relates to an air-conditioning apparatus using the power converter.

BACKGROUND ART

Hitherto, a large-capacity inverter configured to drive a motor of, for example, a compressor or a fan of a refrigerating and air-conditioning apparatus uses a system in which a DC bus voltage for driving the inverter is generated by a three-phase full-wave rectifier circuit. In the refrigerating and air-conditioning apparatus, an attempt is made to increase energy consumption efficiency during rated cooling and heating operations (coefficient of performance; COP) and annual energy consumption efficiency throughout a year (annual performance factor; APF). Therefore, compressor motors tend to be designed so that an induced voltage is substantially equal to a power supply voltage near a rotation speed to be used in the rated operation of the refrigerating and air-conditioning apparatus.

In this case, when an attempt is made to drive the motor in a high-speed range during, for example, an overload operation of the refrigerating and air-conditioning apparatus, in which the rotation speed is higher than that during the rated operation, the inverter cannot output a voltage equal to or higher than the power supply voltage. Therefore, the output voltage is saturated. Thus, a current of the compressor increases and the increase in the current causes a decrease in motor efficiency and an increase in loss of the inverter. As a result, the conversion efficiency of the inverter decreases. Further, the operation range may be narrowed under constraints of demagnetization resistance of a magnet used in the compressor motor, and a permissible current and a permissible temperature of a semiconductor used in the inverter.

In view of the above, there is proposed a power converter including a booster circuit to widen the output voltage range of the inverter (see, for example, Patent Literature 1). Patent Literature 1 discloses that a DC voltage command value for the booster circuit is set to increase in proportion to the rotation speed of the motor.

CITATION LIST

Patent Literature

Patent Literature 1: Japanese Patent No. 3308993

SUMMARY OF INVENTION

Technical Problem

In the method described in Patent Literature 1, however, the required DC voltage increases as the motor rotation speed increases. When the power converter boosts the voltage to a higher voltage, a surge voltage to be generated through a switching operation increases. At this time, it is necessary to keep the boosted voltage within a permissible range in consideration of the magnitude of the surge voltage. Therefore, when the surge voltage is generated, the set value of the boosted voltage is reduced. Thus, the booster circuit cannot boost the voltage to a desired DC voltage. On the other hand, the surge voltage increases as a wiring length in a circuit increases. Therefore, it is necessary to reduce the surge voltage generated depending on the wiring length.

The present disclosure has been made in view of the problems described above and it is therefore an object of the matters disclosed to provide a power converter that can reduce a surge voltage generated depending on a wiring length and boost a voltage to a desired DC voltage, and to provide an air-conditioning apparatus using the power converter.

Solution to Problem

A power converter according to an embodiment of the present disclosure includes a rectifier configured to rectify an AC voltage supplied from an AC power supply, a booster circuit configured to boost the voltage rectified by the rectifier, a smoothing capacitor configured to smooth the voltage output from the booster circuit, a power module configured to convert a DC voltage obtained by smoothing the output voltage by the smoothing capacitor into an AC voltage, and a snubber capacitor configured to absorb a surge voltage superimposed on the DC voltage to be input to the power module. The snubber capacitor is mounted in the power module.

Advantageous Effects of Invention

According to the embodiment of the present disclosure, the snubber capacitor provided in the power module reduces the surge voltage generated depending on the wiring length. Further, the snubber capacitor absorbs the surge voltage to be input to the power module. Therefore, a set value of a voltage to be input to an inverter can be increased. Thus, the voltage can be boosted to a desired DC voltage.

DESCRIPTION OF EMBODIMENTS

Embodiment 1

A power converter according to Embodiment 1 of the present disclosure is described below. The power converter according to Embodiment 1 generates alternating currents each having a set frequency from a three-phase AC power supply and supplies the alternating currents to a load such as a motor of a compressor or an air-sending device of an air-conditioning apparatus.

[Structure of Power Converter 1]

Figure 1:
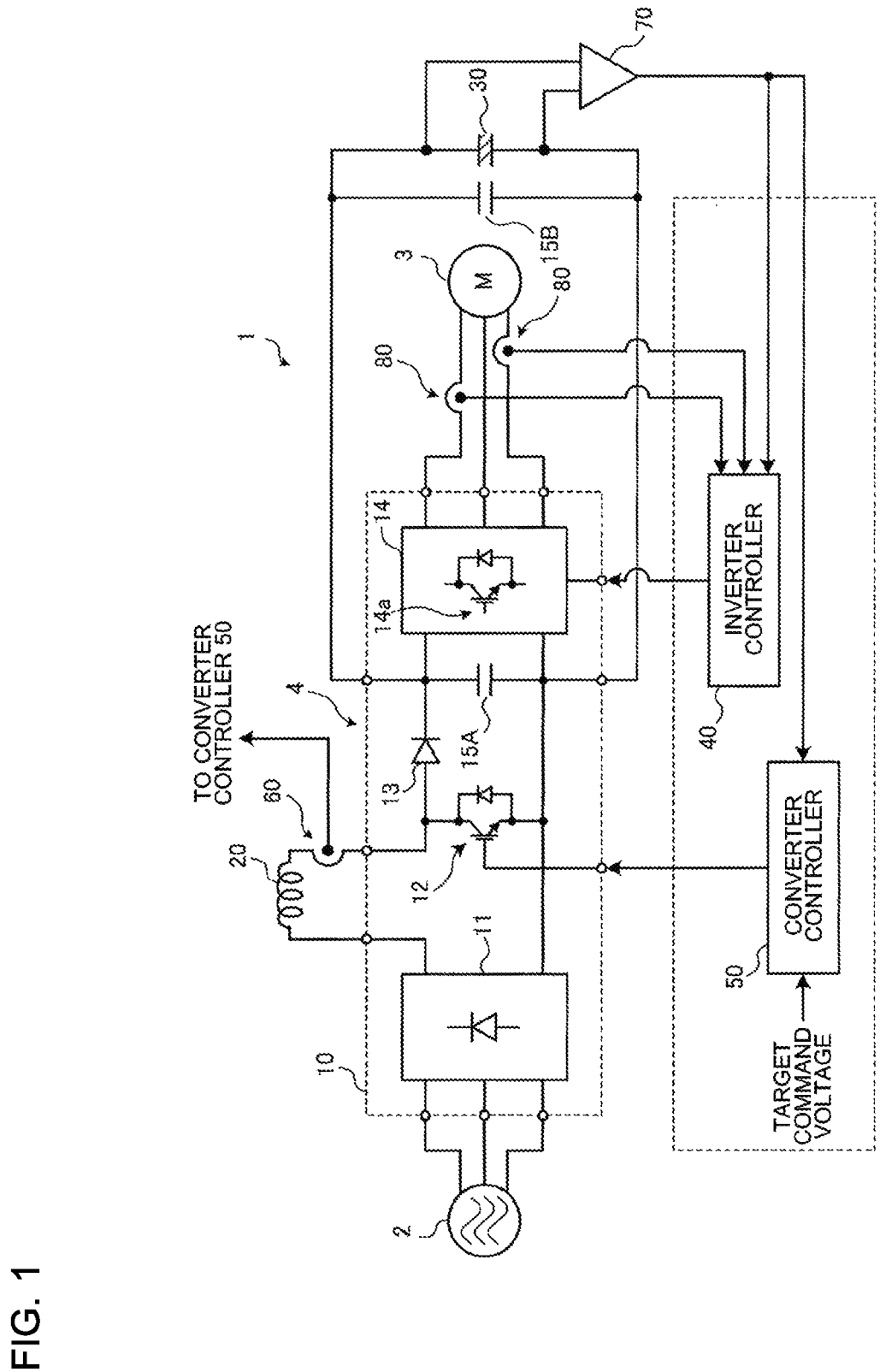
FIG. 1 is a circuit diagram illustrating an example of the structure of a power converter according to Embodiment 1.

FIG. 1 is a circuit diagram illustrating an example of the structure of a power converter 1 according to Embodiment 1. As illustrated in FIG. 1, the power converter 1 converts AC power into DC power and then converts the DC power into AC power again. A three-phase AC power supply 2 is connected to an input side of the power converter 1 and a load 3 is connected to an output side of the power converter 1. The power converter 1 includes a module 10, a reactor 20, a smoothing capacitor 30, and a snubber capacitor 15B.

The module 10 includes a rectifier 11, a switching element 12, a backflow preventing element 13, an inverter 14, and a snubber capacitor 15A in a package. Further, the reactor 20, the switching element 12, and the backflow preventing element 13 constitute a booster circuit 4.

The rectifier 11 is connected to the three-phase AC power supply 2. The rectifier 11 rectifies alternating current (AC) voltages of, for example, AC 200 V or AC 400 V supplied from the three-phase AC power supply 2 and converts the AC voltages into a DC voltage. Examples of the rectifier 11 include a three-phase full-wave rectifier in which six diodes are bridged. The rectifier 11 outputs the rectified voltage to the booster circuit 4.

The booster circuit 4 boosts the voltage rectified by the rectifier 11 to an arbitrary voltage. The reactor 20 that constitutes the booster circuit 4 is connected to an output terminal of the rectifier 11. The backflow preventing element 13 is connected in series to the reactor 20. The switching element 12 is connected between the reactor 20 and the backflow preventing element 13.

The switching element 12 performs a switching operation in which the switching element 12 is turned ON or OFF based on a switching signal supplied from a converter controller 50. Each of the switching element 12 and the backflow preventing element 13 is a wide band gap semiconductor such as a silicon carbide (SiC) element, a gallium nitride (GaN) element, or a diamond element, which is wider than a silicon (Si) element in terms of a band gap.

Note that the switching element 12 is not limited to the elements described above but may be a semiconductor element such as a metal-oxide-semiconductor field-effect transistor (MOSFET) or an insulated gate bipolar transistor (IGBT). Further, the backflow preventing element 13 may be a backflow preventing diode such as a fast recovery diode.

The smoothing capacitor 30 smooths the voltage output from the booster circuit 4. The inverter 14 includes a plurality of switching elements 14a and converts the DC voltage smoothed by the smoothing capacitor 30 into AC voltages serving as pulse width modulation (PWM) voltages. The switching element 14a for use in the inverter 14 is a semiconductor element such as an IGBT similarly to the switching element 12 described above.

The load 3 such as a motor of a compressor of an air-conditioning apparatus is connected to the inverter 14. The inverter 14 supplies AC voltages each having a set frequency to the load 3. The inverter 14 is controlled by an inverter controller 40. Note that the switching element 14a for use in the inverter 14 is not limited to the example described above but may be a wide band gap semiconductor such as silicon carbide (SiC).

The snubber capacitors 15A and 15B are provided to absorb a surge voltage superimposed on the voltage to be input to the inverter 14. The snubber capacitor 15A is connected in parallel to the inverter 14. Further, the snubber capacitor 15A is disposed near the inverter 14. The snubber capacitor 15B is connected in parallel to the smoothing capacitor 30.

The power converter 1 further includes the inverter controller 40, the converter controller 50, a reactor current detector 60, a bus voltage detector 70, and load current detectors 80. The reactor current detector 60 detects a reactor current flowing through the reactor 20 and supplies a detection result to the converter controller 50. The bus voltage detector 70 detects an output voltage accumulated in the smoothing capacitor 30 and supplies a detection result to the inverter controller 40 and the converter controller 50. Each load current detector 80 detects a current output from the inverter 14 and supplies a detection result to the inverter controller 40.

The inverter controller 40 performs PWM control for the inverter 14 based on the output voltage detected by the bus voltage detector 70 and the output currents detected by the load current detectors 80 so that the rotation speed of the motor that is the control target load 3 becomes a target rotation speed. Various functions of the inverter controller 40 are implemented by executing software on a processor such as a microcomputer. Alternatively, the inverter controller 40 is hardware such as a circuit device that implements various functions.

The converter controller 50 generates a switching signal for the switching element 12 based on the output voltage detected by the bus voltage detector 70 and the reactor current detected by the reactor current detector 60 so that the voltage to be output from the booster circuit 4 becomes a target command voltage. Various functions of the converter controller 50 are implemented by executing software on a processor such as a microcomputer. Alternatively, the converter controller 50 is hardware such as a circuit device that implements various functions.

[Operation of Power Converter 1]

Next, an operation of the power converter 1 according to Embodiment 1 is described. As illustrated in FIG. 1, when an AC voltage is supplied from the three-phase AC power supply 2 to the power converter 1, the supplied AC voltage is supplied to the rectifier 11. The rectifier 11 rectifies the supplied AC voltage and outputs a DC voltage. The DC voltage output from the rectifier 11 is supplied to the booster circuit 4. The booster circuit 4 boosts the supplied DC voltage to a set voltage and outputs an output voltage $V_{dc}$.

The converter controller 50 controls an operation of the booster circuit 4 to achieve a constant reactor current. When the switching element 12 is turned ON in the booster circuit 4, the DC voltage obtained through the rectification by the rectifier 11 is applied to the reactor 20 and electric conduction is prohibited by the backflow preventing element 13. When the switching element 12 is turned OFF, on the other hand, the backflow preventing element 13 is brought into conduction and a voltage in a direction opposite to the direction when the switching element 12 is ON is induced in the reactor 20. At this time, energy accumulated in the reactor 20 when the switching element 12 is ON is transferred toward the smoothing capacitor 30. In this case, the voltage to be output from the booster circuit 4 is controlled in such a manner that the ON duty of the switching element 12 is controlled by the converter controller 50.

The output voltage boosted by the booster circuit 4 is accumulated in and smoothed by the smoothing capacitor 30. The output voltage smoothed by the smoothing capacitor 30 is converted into three-phase AC voltages by the inverter 14. Then, the AC voltages obtained through the conversion are supplied to the load 3.

The inverter controller 40 controls operations of the switching elements 14a of the inverter 14. The inverter controller 40 generates a switching signal based on detection results from the bus voltage detector 70 and the load current detectors 80 and supplies the switching signal to the switching elements 14a of the inverter 14.

The converter controller 50 controls the operation of the switching element 12 of the booster circuit 4. The converter controller 50 generates a switching signal based on detection results from the bus voltage detector 70 and the reactor current detector 60 and supplies the switching signal to the switching element 12.

[Reduction of Surge Voltage]

Next, description is made of a method for reducing a surge voltage by the power converter 1 according to Embodiment 1. In general, when a switching operation is performed, a surge voltage is generated along with the switching operation. The surge voltage generated at this time is calculated based on Expression (1). Here, L represents an inductance of a circuit board pattern and wires in the module 10, and di/dt represents an amount of change in a current flowing through the wires.

$$\text{Surge voltage } V = L \times di/dt \tag{1}$$

The inductance L of the wires increases as a wiring length in the circuit increases. As represented by Expression (1), the surge voltage V increases as the wiring length increases. That is, in Embodiment 1, when the switching element 12 performs the switching operation, the surge voltage V is generated depending on the wiring length and a voltage on which the surge voltage V is superimposed is input to the inverter 14.

Here, if the surge voltage V increases depending on the wires, that is, if the voltage input to the inverter 14 is excessive, the switching elements 14a of the inverter 14 are required to have withstanding performance against the excessive voltage. A withstand voltage value for the input voltage is set in each switching element 14a. If a surge voltage V higher than the withstand voltage value is applied to the inverter 14, however, the switching elements 14a are broken and the device malfunctions. Therefore, it is necessary in the related art that the boost amount of the booster circuit 4 be adjusted so that the surge voltage V does not exceed the withstand voltage of each switching element 14a.

However, it is necessary to reduce the set value of the boost amount so that the maximum value of the voltage to be input to the inverter 14 does not exceed the withstand voltage of each switching element 14a. Therefore, high-efficiency motors cannot be employed. Further, generated noise increases as the surge voltage V increases though the maximum value of the voltage to be input to the inverter 14 does not exceed the withstand voltage of each switching element 14a. Therefore, costs required for noise reduction increase or the power converter 1 may operate erroneously.

Figure 2:
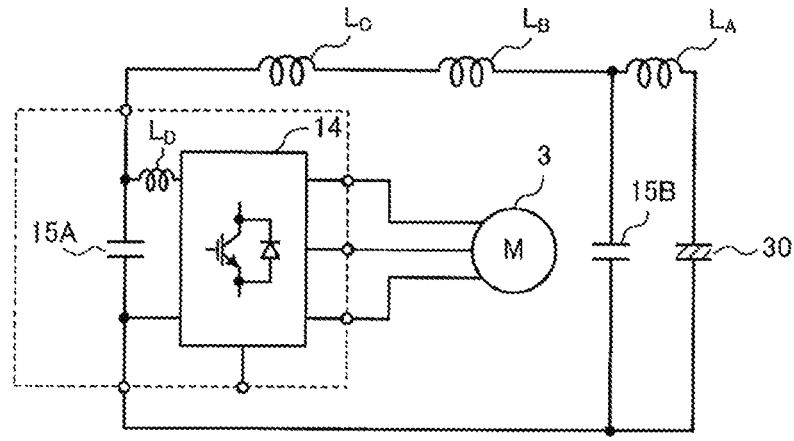
FIG. 2 is a schematic diagram for describing an inductance of wires in the power converter of FIG. 1.

In view of the above, the snubber capacitors 15A and 15B are provided in Embodiment 1 to reduce the surge voltage V in the voltage to be input to the inverter 14. FIG. 2 is a schematic diagram for describing the inductance L of the wires in the power converter 1 of FIG. 1. As illustrated in FIG. 2, wires connecting the inverter 14 and the smoothing capacitor 30 have inductances $L_A$ to $L_D$.

When consideration is made that the inductances $L_A$ to $L_D$ are distributed on the wires, the snubber capacitor 15B can absorb a surge voltage generated due to the inductance $L_A$.

Further, the snubber capacitor 15A can absorb surge voltages generated due to the inductances $L_B$ to $L_D$ in addition to the surge voltage generated due to the inductance $L_A$.

Note that the snubber capacitor 15A is disposed near the inverter 14. Thus, the length of the wire connecting the snubber capacitor 15A and the inverter 14 decreases and the surge voltage to be generated depending on the connecting wire can be reduced.

Figure 3:
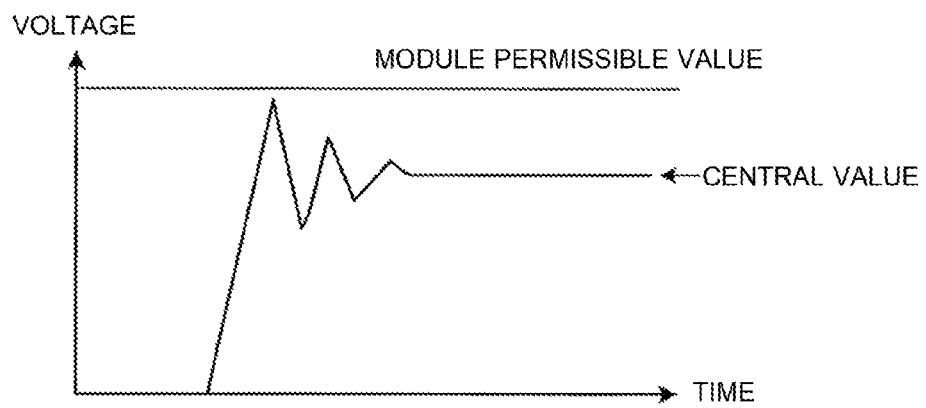
FIG. 3 is a graph illustrating an example of an input voltage of an inverter in a case where snubber capacitors are not mounted.
Figure 4:
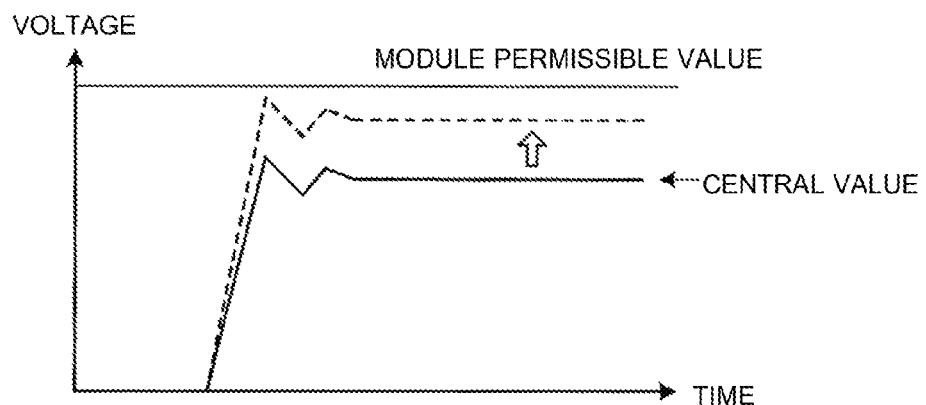
FIG. 4 is a graph illustrating an example of the input voltage of the inverter in a case where the snubber capacitors are mounted.

FIG. 3 is a graph illustrating an example of the input voltage of the inverter 14 in a case where the snubber capacitors 15A and 15B are not mounted. FIG. 4 is a graph illustrating an example of the input voltage of the inverter 14 in a case where the snubber capacitors 15A and 15B are provided. FIG. 3 and FIG. 4 illustrate examples of a case where the set values of the input voltages represented by solid lines are equal.

In the case where the snubber capacitors 15A and 15B are not mounted as illustrated in FIG. 3, a voltage on which a surge voltage generated through the switching operation of the switching element 12 is superimposed is input to the inverter 14. In this case, the set value of the input voltage is set so that the maximum value of the input voltage on which the surge voltage is superimposed does not exceed a permissible voltage of the inverter 14.

In the case where the snubber capacitors 15A and 15B are provided as illustrated in FIG. 4, on the other hand, the surge voltage superimposed on the voltage to be input to the inverter 14 is reduced. Also in this case, the set value of the input voltage is set so that the maximum value of the input voltage on which the surge voltage is superimposed does not exceed the permissible voltage of the inverter 14. The surge voltage is reduced compared with that in the example illustrated in FIG. 3. Therefore, the input voltage can be increased as shown by the dotted line. Thus, the set value of the input voltage can be set higher than the set value in the example illustrated in FIG. 3.

As described above, the surge voltage superimposed on the voltage to be input to the inverter 14 is reduced when the snubber capacitors 15A and 15B are provided. Further, the surge voltage to be generated depending on the wiring length and applied to the switching elements 14a is reduced to the extent possible when the snubber capacitor 15A is disposed near the switching elements 14a of the inverter 14. Therefore, in the power converter 1, the set value of the voltage to be applied to the inverter 14 can be increased depending on the amount of reduction in the surge voltage. Thus, the load 3 such as a motor having a higher efficiency can be supplied with electric power for driving the load 3 by the power converter 1.

[Mounting of Snubber Capacitors 15A and 15B]

Figure 5:
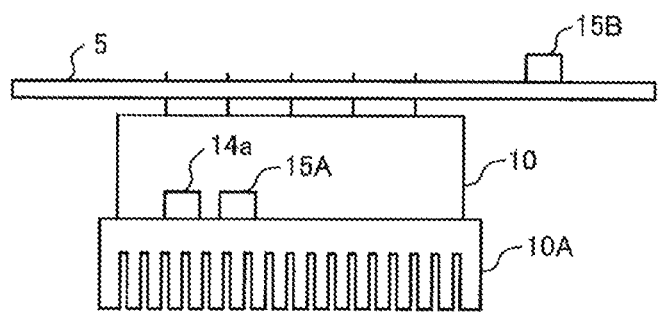
FIG. 5 is a schematic diagram for describing mounting of the power converter of FIG. 1.

FIG. 5 is a schematic diagram for describing mounting of the power converter 1 of FIG. 1. As illustrated in FIG. 5, the module 10 of the power converter 1 is mounted on a circuit board 5. The snubber capacitor 15A is mounted in the module 10 and disposed near the switching element 14a of the inverter 14.

The module 10 is provided with a heat sink 10A serving as a cooling unit configured to cool the elements and other devices in the module 10. Therefore, the heat sink 10A can dissipate heat of, for example, the switching elements 14a in the module 10 and can also dissipate heat of the snubber capacitor 15A. Note that the method for cooling the elements in the module 10 is not limited to the method using the heat sink 10A but any method may be used as long as a cooling function is provided.

Further, the snubber capacitor 15B is mounted on the circuit board 5. The snubber capacitor 15B is directly mounted on the circuit board 5 and therefore heat generated by the snubber capacitor 15B can be dissipated into outside air.

As described above, in Embodiment 1, the snubber capacitor 15A is mounted in the module 10 and the snubber capacitor 15B is mounted on the circuit board 5. Thus, the two snubber capacitors 15A and 15B can individually absorb the surge voltage. Further, each of the snubber capacitors 15A and 15B can be downsized because two snubber capacitors 15A and 15B are provided.

As described above, in the power converter 1 according to Embodiment 1, the snubber capacitor 15A absorbs the surge voltage superimposed on the voltage to be input to the inverter 14. Thus, the set value of the voltage to be input to the inverter 14 can be increased and the voltage can be boosted to a desired voltage.

Further, the module 10 includes the snubber capacitor 15A and the inverter 14 and therefore the snubber capacitor 15A is disposed near the inverter 14. Thus, it is possible to reduce the surge voltage generated depending on the wire connecting the snubber capacitor 15A and the inverter 14.

In Embodiment 1, the snubber capacitor 15B is further mounted outside the module 10. Thus, the two snubber capacitors 15A and 15B can individually absorb the surge voltage and each of the snubber capacitors 15A and 15B can be downsized.

Still further, the module 10 is provided with the heat sink 10A in Embodiment 1. Therefore, it is possible to dissipate heat of, for example, the switching elements 14a in the module 10 and also dissipate heat of the snubber capacitor 15A.

Embodiment 2

Figure 6:
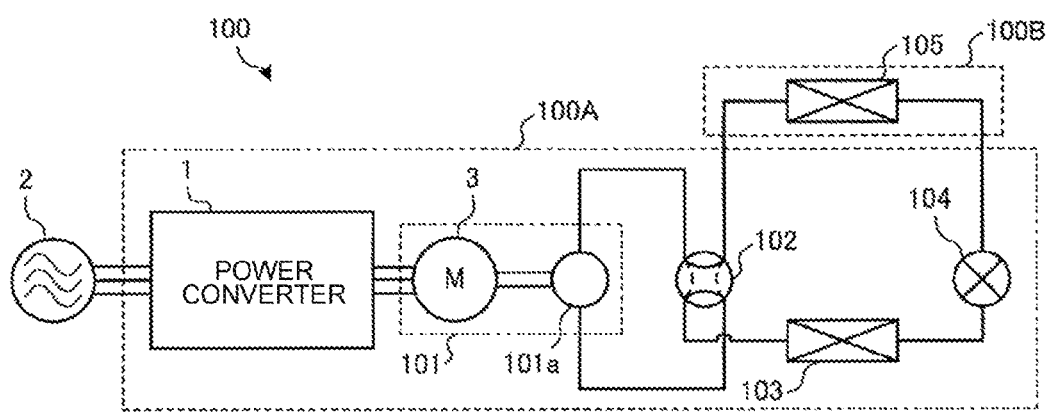
FIG. 6 is a schematic diagram illustrating an example of the structure of an air-conditioning apparatus according to Embodiment 2.

Next, Embodiment 2 of the present disclosure is described. In Embodiment 2, description is made of an example in which the power converter 1 described in Embodiment 1 is applied to an air-conditioning apparatus.
[Structure of Air-Conditioning Apparatus 100]
FIG. 6 is a schematic diagram illustrating an example of the structure of an air-conditioning apparatus 100 according to Embodiment 2. The air-conditioning apparatus 100 of FIG. 6 performs a cooling operation and a heating operation by using a heat pump system.

As illustrated in FIG. 6, the air-conditioning apparatus 100 includes an outdoor unit 100A including a compressor 101, a refrigerant flow switching device 102, an outdoor heat exchanger 103, and an expansion device 104, and an indoor unit 100B including an indoor heat exchanger 105. In the air-conditioning apparatus 100, the compressor 101, the refrigerant flow switching device 102, the outdoor heat exchanger 103, the expansion device 104, and the indoor heat exchanger 105 are sequentially connected by refrigerant pipes to form a refrigerant circuit in which refrigerant circulates through the refrigerant pipes.

Among the components described above, the compressor 101 includes a compression element 101a configured to compress the refrigerant, and a motor M coupled to the compression element 101a and serving as the load 3 to be supplied with electric power from the power converter 1. The power converter 1 is the power converter according to Embodiment 1, which is supplied with electric power from the three-phase AC power supply 2 and supplies the converted electric power to the motor M so that the motor M is driven to rotate.

For example, the refrigerant flow switching device 102 is a four-way valve, which changes a direction in which the refrigerant flows, thereby switching the cooling operation and the heating operation. The outdoor heat exchanger 103 exchanges heat between the refrigerant and outdoor air. The outdoor heat exchanger 103 functions as a condenser during the cooling operation and as an evaporator during the heating operation. The expansion device 104 expands the refrigerant. The indoor heat exchanger 105 exchanges heat between the refrigerant and indoor air in an air-conditioned space. The indoor heat exchanger 105 functions as an evaporator during the cooling operation and as a condenser during the heating operation.
[Operations of Air-Conditioning Apparatus 100]
Next, operations of the air-conditioning apparatus 100 according to Embodiment 2 are described with reference to FIG. 6. Here, the cooling operation is described as an example. When the cooling operation is performed, the refrigerant flow switching device 102 changes a passage in advance so that the refrigerant discharged from the compressor 101 flows toward the outdoor heat exchanger 103 and the refrigerant flowing out of the indoor heat exchanger 105 flows toward the compressor 101. At this time, the outdoor heat exchanger 103 functions as the condenser and the indoor heat exchanger 105 functions as the evaporator.

When the motor M of the compressor 101 is driven to rotate by the power converter 1, the compression element 101a of the compressor 101, which is coupled to the motor M, compresses low-temperature and low-pressure refrigerant and the compressor 101 discharges high-temperature and high-pressure gas refrigerant. The high-temperature and high-pressure gas refrigerant discharged from the compressor 101 flows into the outdoor heat exchanger 103 that functions as the condenser via the refrigerant flow switching device 102.

The high-temperature and high-pressure gas refrigerant flowing into the outdoor heat exchanger 103 exchanges heat with outdoor air to reject the heat and is condensed into high-pressure liquid refrigerant. The high-pressure liquid refrigerant flows out of the outdoor heat exchanger 103. The expansion device 104 expands the high-pressure liquid refrigerant flowing out of the outdoor heat exchanger 103 to reduce a pressure of the refrigerant. Therefore, the refrigerant turns into low-temperature and low-pressure two-phase gas-liquid refrigerant. The low-temperature and low-pressure two-phase gas-liquid refrigerant flows into the indoor heat exchanger 105 that functions as the evaporator.

The low-temperature and low-pressure two-phase gas-liquid refrigerant flowing into the indoor heat exchanger 105 exchanges heat with air in the air-conditioned space to remove the heat and is evaporated to cool the indoor air. Therefore, the refrigerant turns into low-temperature and low-pressure gas refrigerant and flows out of the indoor heat exchanger 105. The low-temperature and low-pressure gas refrigerant flowing out of the indoor heat exchanger 105 is sucked into the compressor 101 via the refrigerant flow switching device 102 and is compressed again. Then, the operation described above is repeated.

Note that FIG. 6 illustrates the example in which the power converter 1 according to Embodiment 1 is applied to the compressor 101 of the air-conditioning apparatus 100 but the application of the power converter 1 is not limited to that in this example. For example, the power converter 1 may be applied to a driving power supply for an unillustrated fan configured to send air to the outdoor heat exchanger 103. Further, the power converter 1 may be applied to, for example, a heat pump apparatus, a refrigeration apparatus, and other general refrigeration cycle apparatuses.

As described above, in the air-conditioning apparatus 100 according to Embodiment 2, the compressor 101 provided on the refrigerant circuit is driven by electric power supplied from the power converter 1. Therefore, similarly to Embodiment 1, the surge voltage can be reduced and a motor having a higher efficiency may be used as the motor M configured to drive the compressor 101.

REFERENCE SIGNS LIST

1 power converter 2 three-phase AC power supply 3 load 4 booster circuit 5 circuit board 10 module 10A heat sink 11 rectifier 12 switching element 13 backflow preventing element 14 inverter 14a switching element 15A, 15B snubber capacitor 20 reactor 30 smoothing capacitor 40 inverter controller 50 converter controller 60 reactor current detector 70 bus voltage detector 80 load current detector 100 air-conditioning apparatus 100A outdoor unit 100B indoor unit 101 compressor 101a compression element 102 refrigerant flow switching device 103 outdoor heat exchanger 104 expansion device 105 indoor heat exchanger

The invention claimed is:

1. A power converter, comprising:
   a rectifier configured to rectify an AC voltage supplied from an AC power supply;
   a booster circuit configured to boost the voltage rectified by the rectifier;
   a smoothing capacitor configured to smooth the voltage output from the booster circuit;
   a power module configured to convert a DC voltage obtained by smoothing the output voltage by the smoothing capacitor into an AC voltage;
   a snubber capacitor configured to absorb a surge voltage superimposed on the DC voltage to be input to the power module;
   an auxiliary snubber capacitor mounted outside the power module;
   a cooling unit configured to cool the power module; and
   a circuit board on which the power module is mounted,
   wherein the auxiliary snubber capacitor is mounted on the circuit board,
   wherein the cooling unit is provided at the power module,
   wherein the snubber capacitor is mounted in the power module and is directly adjacent to the cooling unit,
   wherein the power module includes an inverter provided as a switching element,
   wherein the switching element is directly adjacent to the cooling unit, and
   wherein the snubber capacitor is provided adjoining to the switching element.

2. The power converter of claim 1,
   wherein a second switching element is used for the booster circuit, and
   wherein at least one of the second switching element of the booster circuit and the switching element of the power module is made of a wide band gap semiconductor.

3. An air-conditioning apparatus, comprising:
   the power converter of claim 1; and
   a refrigerant circuit through which refrigerant circulates,
   wherein the refrigerant circuit is formed by sequentially connecting, via refrigerant pipes, a compressor to be driven by electric power supplied from the power converter, an outdoor heat exchanger, an expansion device, and an indoor heat exchanger.

4. The power converter of claim 1,
   wherein the circuit board is a double-sided circuit board, having one side on which the power module is mounted, and an other side on which the auxiliary snubber capacitor is mounted.

* * * * *